US011922900B2

(12) United States Patent
Aurongzeb et al.

(10) Patent No.: US 11,922,900 B2
(45) Date of Patent: Mar. 5, 2024

(54) MANAGING A DISPLAY OF AN INFORMATION HANDLING SYSTEM

(71) Applicant: Dell Products L.P., Round Rock, TX (US)

(72) Inventors: Deeder Aurongzeb, Austin, TX (US); Mandy Christina Phelps, Georgetown, TX (US); Malathi R, Madurai (IN)

(73) Assignee: Dell Products L.P., Round Rock, TX (US)

( * ) Notice: Subject to any disclaimer, the term of this patent is extended or adjusted under 35 U.S.C. 154(b) by 190 days.

(21) Appl. No.: 17/646,564

(22) Filed: Dec. 30, 2021

(65) Prior Publication Data

US 2023/0215402 A1 Jul. 6, 2023

(51) Int. Cl.
*G09G 5/10* (2006.01)
*G09G 5/00* (2006.01)

(52) U.S. Cl.
CPC ............... *G09G 5/10* (2013.01); *G09G 5/003* (2013.01); *G09G 2320/0233* (2013.01); *G09G 2320/043* (2013.01); *G09G 2320/0673* (2013.01); *G09G 2360/08* (2013.01); *G09G 2360/144* (2013.01)

(58) Field of Classification Search
CPC ................................. G09G 5/10; G09G 5/003
USPC ......................................... 345/204, 501, 581
See application file for complete search history.

(56) References Cited

U.S. PATENT DOCUMENTS

| | | | | |
|---|---|---|---|---|
| 2008/0018657 A1* | 1/2008 | Montag | G06F 3/14 | 345/581 |
| 2013/0009551 A1* | 1/2013 | Knapp | H05B 45/22 | 315/294 |
| 2014/0085324 A1* | 3/2014 | Charvet | G09G 5/006 | 345/646 |
| 2018/0329580 A1* | 11/2018 | Aurongzeb | G09G 3/035 | |
| 2019/0014205 A1* | 1/2019 | Miloseski | H04M 1/72451 | |
| 2019/0244426 A1* | 8/2019 | Knoppert | G06F 3/03 | |
| 2021/0241675 A1* | 8/2021 | Atkinson | G09G 3/3406 | |

* cited by examiner

*Primary Examiner* — Prabodh M Dharia
(74) *Attorney, Agent, or Firm* — McDermott Will & Emery LLP

(57) ABSTRACT

A method for managing a display of an information handling system includes: monitoring, by a display controller, a usage period of the display indicating a period of time in which the display is in an illuminated state; determining, by the display controller, that the usage period is greater than a threshold usage period; causing, by the display controller, a brightness level of the display to decrease; sending, by the display controller, a signal to a graphics processing unit; receiving, by the graphics processing unit, the signal; determining, by the graphics processing unit, a contrast level associated with one or more images presented to a user; determining, by the graphics processing unit, a gamma level associated with the one or more images; and processing, by the graphics processing unit, the one or more images based on the contrast level and the gamma level.

18 Claims, 3 Drawing Sheets

MANAGING A DISPLAY OF AN INFORMATION HANDLING SYSTEM

BACKGROUND

Field of the Disclosure

The disclosure relates generally to information handling systems, and in particular to managing a display of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for managing a display of an information handling system includes: monitoring, by a display controller of the information handling system, a usage period of the display, the usage period indicating a period of time in which the display is in an illuminated state; determining, by the display controller, that the usage period is greater than a threshold usage period; causing, by the display controller, a brightness level of the display to decrease; sending, by the display controller, a signal to a graphics processing unit (GPU) of the information handling system, the signal indicating that the usage period is greater than the threshold usage period; receiving, by the GPU, the signal indicating that the usage period is greater than the threshold usage period; determining, by the GPU, a contrast level associated with one or more images presented to a user via the display; determining, by the GPU, a gamma level associated with the one or more images; and processing, by the GPU, the one or more images based on the contrast level and the gamma level.

In one or more of the disclosed embodiments, causing the brightness level of the display to decrease includes: identifying, by the display controller, a current application executing on the information handling system; accessing, by the display controller, a look up table (LUT) storing a plurality of brightness profiles, each of the plurality of brightness profiles associated with an application; selecting, by the display controller and from the plurality of brightness profiles, the brightness profile associated with the current application; and causing, by the display controller, the brightness level of the display to decrease based on the brightness profile.

In one or more of the disclosed embodiments, determining the contrast level associated with the one or more images includes: identifying, by the GPU, a current application executing on the information handling system; accessing, by the GPU, a look up table (LUT) storing a plurality of contrast profiles, each of the plurality of contrast profiles associated with an application; selecting, by the GPU and from the plurality of contrast profiles, the contrast profile associated with the with the current application; and applying, by the GPU, the contrast profile to the one or more images.

In one or more of the disclosed embodiments, determining the gamma level associated with the one or more images comprises at least one of: calculating, by the GPU, the gamma level based on a logarithmic function; and calculating, by the GPU, the gamma level based on an exponential function.

In one or more of the disclosed embodiments, processing the one or more images based on the contrast level and the gamma level includes: determining, by the GPU, an ambient lighting within an environment of the user; modifying, by the GPU, the contrast level based on the ambient lighting to generate a modified contrast level; modifying, by the GPU, the gamma level based on the ambient lighting to generate a modified gamma level; and applying, by the GPU, the modified contrast level and the modified gamma level to the one or more images.

In one or more of the disclosed embodiments, determining the ambient lighting within the environment of the user includes: receiving, by the GPU, ambient lighting data from a processor subsystem of the information handling system, the ambient lighting data captured by one or more sensors of the information handling system.

In one or more of the disclosed embodiments, causing the brightness level of the display to decrease causes a lifecycle of the display to increase.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
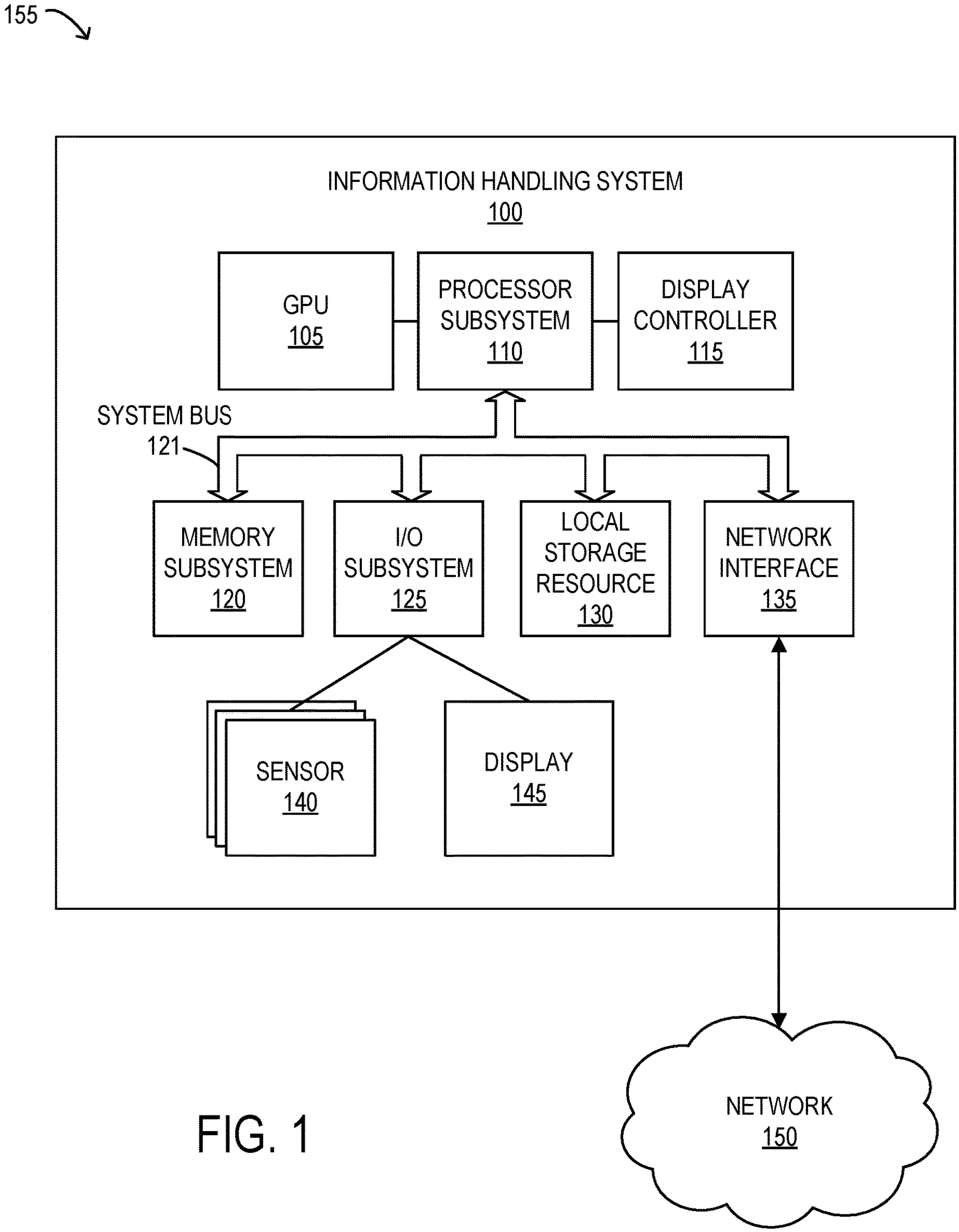
FIG. 1 is a block diagram of selected elements of an embodiment of a computing environment that includes an information handling system.

This document describes a method for managing a display of an information handling system that includes: monitoring, by a display controller of the information handling system, a usage period of the display, the usage period indicating a period of time in which the display is in an illuminated state;

determining, by the display controller, that the usage period is greater than a threshold usage period; causing, by the display controller, a brightness level of the display to decrease; sending, by the display controller, a signal to a graphics processing unit (GPU) of the information handling system, the signal indicating that the usage period is greater than the threshold usage period; receiving, by the GPU, the signal indicating that the usage period is greater than the threshold usage period; determining, by the GPU, a contrast level associated with one or more images presented to a user via the display; determining, by the GPU, a gamma level associated with the one or more images; and processing, by the GPU, the one or more images based on the contrast level and the gamma level.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
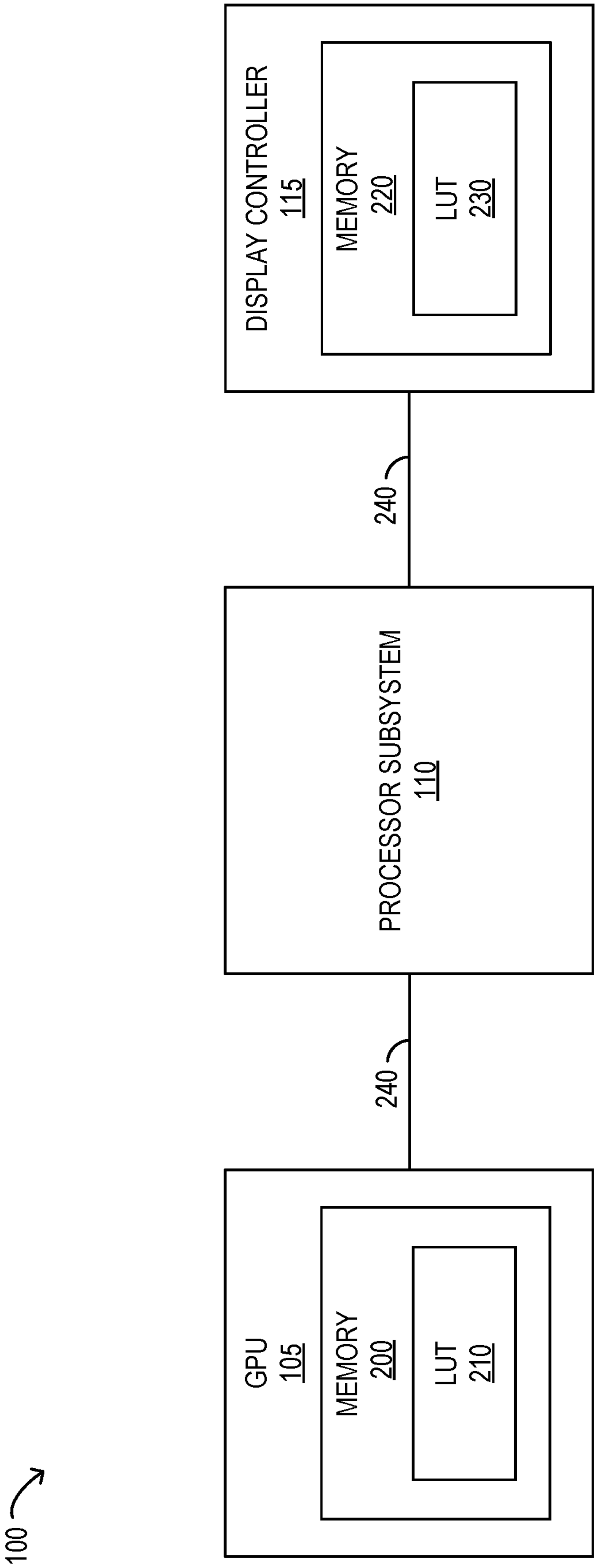
FIG. 2 is a block diagram of selected elements of an embodiment of an information handling system that includes a graphics processing unit (GPU) and a display controller.
Figure 3:
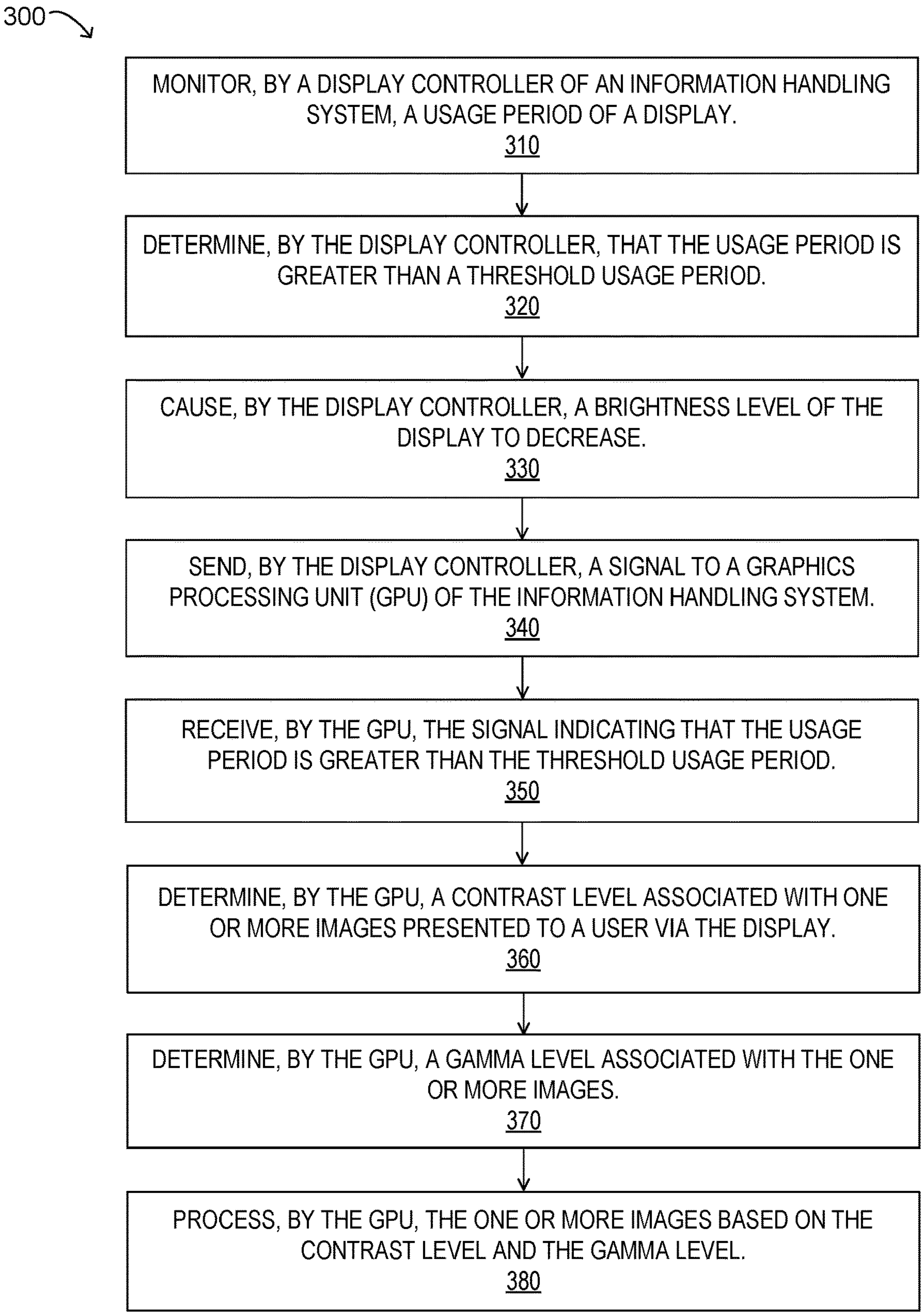
FIG. 3 is a flowchart depicting selected elements of an embodiment of a method for managing a display of an information handling system.

Particular embodiments are best understood by reference to FIGS. 1-3 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 110, which may comprise one or more processors, and system bus 121 that communicatively couples various system components to processor subsystem 110 including, for example, a memory subsystem 120, an I/O subsystem 125, a local storage resource 130, and a network interface 135. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus. As shown in FIG. 1, information handling system 100 may additionally include a graphics processing unit (GPU) 105, a display controller 115, one or more sensors 140, and a display 145. In other embodiments, computing environment 155 may include additional, fewer, and/or different components than the components shown in FIG. 1.

In information handling system 100, processor subsystem 110 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 110 may interpret and/or execute program instructions and/or process data stored locally (e.g., in memory subsystem 120 and/or another component of information handling system 100). In the same or alternative embodiments, processor subsystem 110 may interpret and/or execute program instructions and/or process data stored remotely. In one embodiment, processor subsystem 110 may be or include a multi-core processor comprised of one or more processing cores disposed upon an integrated circuit (IC) chip. In other embodiments, processor subsystem 110 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 120 may comprise a system, device, or apparatus operable to retain and/or retrieve program instructions and/or data for a period of time (e.g., computer-readable media). Memory subsystem 120 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 125 may comprise a system, device, or apparatus generally operable to receive and/or transmit data to, from, and/or within information handling system 100. I/O subsystem 125 may represent, for example, a variety of communication interfaces, graphics interfaces, video interfaces, user input interfaces, and/or peripheral interfaces. In various embodiments, I/O subsystem 125 may be used to support various peripheral devices, such as a touch panel, a display adapter, a keyboard, an accelerometer, a touch pad, a gyroscope, an IR sensor, a microphone, a sensor, a camera, or another type of peripheral device. In the embodiment illustrated in FIG. 1, I/O subsystem 125 may be communicably coupled to one or more sensors 140 and display 145.

In one embodiment, local storage resource 130 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 135 may be a suitable system, apparatus, or device operable to serve as an interface between information handling system 100 and a network 150. Network interface 135 may enable information handling system 100 to communicate over network 150 using a suitable transmission protocol and/or standard, including, but not limited to, transmission protocols and/or standards enumerated below with respect to the discussion of network 150. Network 150 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 135 may enable wired and/or wireless communications (e.g., NFC or Bluetooth) to and/or from information handling system 100.

In particular embodiments, network 150 may include one or more routers for routing data between client information handling systems 100 and server information handling systems 100. A device (e.g., a client information handling system 100 or a server information handling system 100) on network 150 may be addressed by a corresponding network address including, for example, an Internet protocol (IP) address, an Internet name, a Windows Internet name service (WINS) name, a domain name or other system name. In particular embodiments, network 150 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 150 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 150 and its various components may be implemented using hardware, software, or any combination thereof.

In one embodiment, each sensor 140 (collectively referred to herein as "sensors 140") may be suitable system, apparatus, or device operable to detect a light, or an "ambient lighting," within an environment of a user of information handling system 100 (e.g., within computing environment 155). Specifically, each sensor 140 may be or include a photoelectric device operable to convert detected light energy (i.e., photons) into electrical energy (i.e., electrons). In one embodiment, each sensor 140 may be installed within, or otherwise coupled to, information handling system 100 such that sensors 140 may detect an ambient lighting within the environment of a user of information handling system 100. That is, sensors 140 may capture light energy, or "ambient lighting data," generated by one or more light sources (e.g., tungsten light, sun light, fluorescent light, and the like) within the environment of the user. In the embodiment illustrated in FIG. 1, sensors 140 may be communicably coupled to processor subsystem 110 (via I/O subsystem 125) such that sensors 140 may provide the ambient lighting data to processor subsystem 110 for processing. In one embodiment, GPU 105 may receive the ambient lighting data captured by sensors 140 (e.g., from processor subsystem 110) to determine an ambient lighting within the environment of the user used, in part, to process one or more images presented to the user via display 145. In one embodiment, each sensor 140 may be or include a light dependent resistor (LDR) sensor, a photodiode sensor, a phototransistor sensor, and/or any other type of photoelectric device operable for detecting an ambient lighting within an environment of a user of information handling system 100.

In one embodiment, display 145 may be a suitable system, apparatus, or device operable to display information processed by information handling system 100. In particular, display 145 may be or include an output device comprised of a light source configured to emit visible light to display information to a user, a casing to house the light source, and a power supply. In one embodiment, display 145 be or include an organic light-emitting diode (OLED) display including an OLED light source. In other embodiments, display 145 may be or include a light-emitting diode (LED) monitor, a plasma display panel monitor, and/or any other type of monitor suitable for displaying information processed by information handling system 100.

In one embodiment, GPU 105 may be a suitable system, apparatus, or device operable to support dedicated graphics for information handling system 100. Specifically, GPU 105 may generate a feed of output images to be displayed to a user of information handling system (e.g., via I/O subsystem 125). In one embodiment, GPU 105 may include a random-access memory (RAM) and power regulators specifically designed for processing one or more images (e.g., video images, CAD images, word processing images, and the like) to offload processing demands on processor subsystem 110 of information handling system 100 and system RAM (e.g., memory subsystem 120). Specifically, GPU 105 may include a dedicated memory device (e.g., memory 200 shown in FIG. 2) used for storing instructions (e.g., software and/or firmware instructions) operable for processing one or more images for presentation to a user via display 145.

Conventionally, GPUs may process one or more images for display such that the one or more images include static, or predefined, contrast settings, or "contrast levels." Similarly, conventional GPUs may process one or more images having static, or predefined, gamma settings, or "gamma levels." However, such processing performed by conventional GPUs may not account for wear, or fatigue, experienced by individual pixels within a display as the pixels maintain a given brightness, or a "brightness level," over continued usage. That is, pixels within the display may undergo a significant loss in overall brightness level (e.g., loss of half the manufactured brightness level) throughout the lifecycle of the display, thereby decreasing both the lifecycle of the display and overall user experience. For example, an OLED display comprised of pixels having red, green, and blue (RGB) subpixels therein may experience a decrease in brightness level from approximately 400 nits to approximately 200 nits within a 3-year lifecycle. In contrast, GPU 105 may increase the lifecycle of a display by accounting for the wear, or fatigue, experienced by individual pixels within the display. Specifically, GPU 105 may process one or more images for presentation to a user via display 145 by adjusting contrast levels and/or gamma levels of the one or more images in response to a decreased brightness level within display 145. The decreased brightness level may be caused by display controller 115 in response to prolonged usage of display 145 by a user. GPU 105 is described in further detail with respect to FIG. 2.

In one embodiment, display controller 115 may be a suitable system, apparatus, or device operable to manage a display of information handling system 100. In particular, display controller 115 may be or include a hardware device (e.g., microcontroller) operable to monitor a usage, or a "usage period," of display 145 indicating a period of time in which display 145 is in an illuminated state. For example, display controller 115 may receive display usage data from GPU 105 indicating an operational state of display 145 in which pixels comprising display 145 may be in an illuminated or unilluminated state. As described above, conventional GPUs may not account for wear, or fatigue, experienced by individual pixels within a display as the pixels maintain a given brightness level over continued usage. As a result, pixels within the display may undergo a significant loss in overall brightness level (e.g., loss of half the manufactured brightness level) throughout the lifecycle of the display, thereby decreasing both the lifecycle of the display and overall user experience.

In one embodiment, display controller 115 may determine that a usage period of display 145 is greater than, or equal to, a usage period, or a "threshold usage period," in which pixels within display 145 may begin to experience wear, or fatigue, that may contribute to a significant loss in overall brightness level. For example, display controller 115 may determine that the usage period of display 145 is greater than, or equal to, the threshold usage period based on display usage data received by GPU 105. In response to determining that the usage period is greater than, or equal to, the threshold usage period, display controller 115 may cause the brightness level of display 145 to decrease. For example, display controller 115 may cause a brightness level of 400 nits to decrease to a brightness level of 300 nits in response to determining that the threshold usage period has been exceeded. As such, display controller 115 may preemptively avoid prolonged usage of display 145 at a given brightness level that may cause pixels within display 145 to experience wear, or fatigue, thereby increasing both the lifecycle of display 145 and overall user experience. Display controller 115 is described in further detail with respect to FIG. 2.

FIG. 2 is a block diagram of selected elements of an embodiment of an information handling system that includes a graphics processing unit (GPU) and a display controller. In the embodiment illustrated in FIG. 2, GPU 105 is communicably coupled to processor subsystem 110. GPU 105 may access information associated with one or more processes, and/or applications, executed by processor subsystem 110 via application programming interface (API) 240. GPU 105 includes memory 200 used to store look up table (LUT) 210. Similarly, display controller 115 is communicably coupled to processor subsystem 110. Display controller 115 may access information associated with one or more processes, and/or applications, executed by processor subsystem 110 via application programming interface (API) 240. Display controller 115 includes memory 220 used to store LUT 230. In other embodiments, information handling system 100 may include additional, fewer, and/or different components than the components shown in FIG. 1.

In one embodiment, display controller 115 may cause a brightness level of display 145 to decrease in response to determining that a usage period of display 145 is greater than, or equal to, a threshold usage period as described above with respect to FIG. 1. Specifically, display controller 115 may cause the brightness level of display 145 to decrease based on a current application executing on information handling system 100. Here, standard applications (e.g., word processing applications, video conferencing applications, spreadsheet applications, and the like) that do not require increased brightness levels to highlight detail in display 145 may receive a larger decrease in brightness levels than high performance applications (e.g., movie streaming applications, computer-aided design (CAD) applications, image processing applications, and the like) that may require increased brightness for clarity. For example, display controller 115 may cause the brightness level of display 145 to decrease from 400 nits to 300 nits when the threshold usage period is met, or exceeded, while information handling system 100 is executing a word processing application. In another example, display controller 115 may cause the brightness level of display 145 to decrease from 400 nits to 380 nits when the threshold usage period is met, or exceeded, while information handling system 100 is executing a CAD application.

To cause the brightness level of display 145 to decrease based on a current application executing on information handling system 100, display controller 115 may access information associated with one or more processes, and/or applications, executed by processor subsystem 110 via API 240. That is, display controller 115 may identify a current application executing on information handling system 100 via API 240. Once identified, display controller 115 may access LUT 230 stored in memory 220. In one embodiment, LUT 230 may store multiple brightness levels, or "brightness profiles," associated with processes, and/or applications, executing on information handling system 100. Each brightness profile stored in LUT 230 may indicate a brightness level to which display 145 may be decreased, or dimmed, in response to the threshold usage period being met, or exceeded. For example, a brightness profile associated with a word processing application may indicate a brightness level of 300 nits, indicating that the brightness level may be decreased to 300 nits in response to the threshold usage period of display 145 being met, or exceeded. In another example, a brightness profile associated with a CAD application may indicate a brightness level of 380 nits, indicating that the brightness level may be decreased to 380 nits in response to the threshold usage period of display 145 being met, or exceeded. In one embodiment, display controller 115 may select the brightness profile associated with the current application executing on information handling system 100 and may cause the brightness level of display 145 to decrease based on the brightness profile. Upon causing the brightness level of display 145 to decrease, display controller 115 may send a signal (e.g., an interrupt) to GPU 105 indicating that the usage period is greater than, or equal to, the threshold usage period.

In one embodiment, GPU 105 may determine a contrast level associated with one or more images presented to a user via display 145 in response to receiving the signal from display controller 115. Specifically, GPU 105 may access information associated with one or more processes, and/or applications, executed by processor subsystem 110 via API 240. That is, GPU 105 may identify a current application executing on information handling system 100 via API 240. Once identified, GPU 105 may access LUT 210 stored in memory 200. In one embodiment, LUT 210 may store multiple contrast levels, or "contrast profiles," associated with processes, and/or applications, executing on information handling system 100. Each contrast profile stored in LUT 210 may indicate a contrast level at which the one or more images presented on display 145 may be modified in response to the decreased brightness level caused by display controller 115. That is, each contrast profile may indicate a contrast level (e.g., high contrast, low contrast, and the like) at which the one or more images may be modified such that the user may not detect a significant change in contrast level of the one or more images after the brightness level has been decreased. For example, a contrast profile associated with a spreadsheet application may indicate a minimal change in luminance and/or color within the one or more images displayed to the user in response to the threshold usage period of display 145 being met, or exceeded. In another example, a contrast profile associated with a movie streaming application may indicate a significant change in luminance and/or color within the one or more images displayed to the user in response to the threshold usage period of display 145 being met, or exceeded. In one embodiment, GPU 105 may select the contrast profile associated with the current application executing on information handling system 100 and may apply the contrast level to the one or more images presented on display 145 to increase and/or decrease the contrast level based on the contrast profile.

In one embodiment, GPU 105 may determine a gamma level associated with one or more images presented to a user via display 145 in response to receiving the signal from display controller 115. In particular, GPU 105 may execute one or more mathematical operations used to calculate the gamma level based on the contrast profile associated with the current application executing on information handling system 100. In one embodiment, GPU 105 may calculate the gamma level based on a logarithmic function when the current application is associated with a contrast profile indicating a low contrast level. Here, the gamma level may increase and/or decrease slowly such that the gamma level appears to remain constant to the user given the low contrast level of the one or more images. In another embodiment, GPU 105 may calculate the gamma level based on an exponential function when the current application is associated with a contrast profile indicating a high contrast level. Here, the gamma level may increase and/or decrease rapidly such that the gamma level appears to remain constant to the user given the high contrast level of the one or more images.

In one embodiment, GPU 105 may process the one or more images presented to the user via display 145 based on the determined contrast level and the gamma level. Specifically, GPU 105 may process the one or more images based on the determined contrast level and gamma level such that the contrast level and gamma level of the one or more images may appear to remain constant despite a decrease in brightness level of display 145. In one embodiment, GPU 105 may account for the ambient lighting within an environment of the user while processing the one or more images. In particular, GPU 105 may receive ambient lighting data captured by sensors 140 (shown in FIG. 1) to determine an ambient lighting within the environment of the user as described above with respect to FIG. 1. Here, GPU 105 may modify the contrast level based on the ambient lighting data to generate a contrast level, or a "modified contrast level," that corresponds to the ambient lighting present in the environment of the user. In one embodiment, a bright environment may allow for a low contrast level presented to the user. For example, in response to determining that the user may be located outside based on the ambient lighting data captured by sensors 140, GPU 105 may cause the contrast level to decrease given that a high contrast level may cause certain details within the one or more images to become muted, or washed out, when presented to the user via display 145. In another embodiment, a dark environment may require a high contrast level presented to the user. For example, in response to determining that the user may be located inside a dark room based on the ambient lighting data captured by sensors 140, GPU 105 may cause the contrast level to increase given that a high contrast level may cause certain details within the one or more images to become clearer, or crisper, when presented to the user via display 145.

Similarly, GPU 105 may modify the gamma level based on the ambient lighting data to generate a gamma level, or a "modified gamma level," that corresponds to the ambient lighting present in the environment of the user. In one embodiment, a bright environment may allow for a low gamma level presented to the user. For example, in response to determining that the user may be located outside based on the ambient lighting data captured by sensors 140, GPU 105 may cause the gamma level to decrease to 2.2 given that a high gamma level may cause certain details within the one or more images to become muted, or washed out, when presented to the user via display 145. In another embodiment, a dark environment may require a high gamma level presented to the user. For example, in response to determining that the user may be located inside a dark room based on the ambient lighting data captured by sensors 140, GPU 105 may cause the gamma level to increase to 2.4 given that a high gamma level may cause certain details within the one or more images to become clearer, or crisper, when presented to the user via display 145. Upon determining, the modified contrast level and/or the modified gamma level, GPU 105 may apply the modified contrast level and/or modified gamma level to the one or more images such that the contrast level and gamma level of the one or more images may appear to remain constant despite a decrease in brightness level of display 145 and/or changes in ambient lighting within the environment of the user.

FIG. 3 is a flowchart depicting selected elements of an embodiment of a method for managing a display of an information handling system. It is noted that certain operations described in method 300 may be optional or may be rearranged in different embodiments.

Method 300 may begin at step 310, where a display controller of the information handling system may monitor a usage period of the display. The usage period may indicate a period of time in which the display is in an illuminated state. For example, display controller 115 may receive display usage data from GPU 105 indicating an operational state of display 145 in which pixels comprising display 145 may be in an illuminated or unilluminated state as described above with respect to FIG. 1. At step 320, the display controller may determine that the usage period is greater than a threshold usage period. For example, display controller 115 may determine that the usage period of display 145 is greater than, or equal to, the threshold usage period based on display usage data received by GPU 105 as described above with respect to FIG. 1. At step 330, the display controller may cause a brightness level of the display to decrease. For example, display controller 115 may cause a brightness level of 400 nits to decrease to a brightness level of 300 s in response to determining that the threshold usage period has been exceeded as described above with respect to FIG. 1. At step 340, the display controller may send a signal to a GPU of the information handling system indicating that the usage period is greater than the threshold usage period. For example, upon causing the brightness level of display 145 to decrease, display controller 115 may send a signal (e.g., an interrupt) to GPU 105 indicating that the usage period is greater than, or equal to, the threshold usage period as described above with respect to FIG. 2. At steps 350 and 360, the GPU may receive the signal and may determine a contrast level associated with one or more images presented to a user via the display. For example, GPU 105 may determine a contrast level associated with one or more images presented to a user via display 145 in response to receiving the signal from display controller 115 as describe above with respect to FIG. 2. At step 370, the GPU may determine a gamma level associated with the one or more images. For example, GPU 105 may determine a gamma level associated with one or more images presented to a user via display 145 in response to receiving the signal from display controller 115 as described above with respect to FIG. 2. At step 380, the GPU may process the one or more images based on the contrast level and the gamma level. For example, GPU 105 may process the one or more images based on the determined contrast level and gamma level such that the contrast level and gamma level of the one or more images may appear to remain constant despite a decrease in brightness level of display 145 as described above with respect to FIG. 2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing a display of an information handling system, the method comprising:

monitoring, by a display controller of the information handling system, a usage period of the display, the usage period indicating a period of time in which the display is in an illuminated state;

determining, by the display controller, that the usage period is greater than a threshold usage period;

causing, by the display controller, a brightness level of the display to decrease;

causing, by the display controller and in response to the decrease in the brightness level of the display, a lifecycle of the display to increase;

sending, by the display controller, a signal to a graphics processing unit (GPU) of the information handling system, the signal indicating that the usage period is greater than the threshold usage period;

receiving, by the GPU, the signal indicating that the usage period is greater than the threshold usage period;

determining, by the GPU, a contrast level associated with one or more images presented to a user via the display;

determining, by the GPU, a gamma level associated with the one or more images; and processing, by the GPU, the one or more images based on the contrast level and the gamma level.

2. The method of claim 1, wherein causing the brightness level of the display to decrease comprises:

identifying, by the display controller, a current application executing on the information handling system;

accessing, by the display controller, a look up table (LUT) storing a plurality of brightness profiles, each of the plurality of brightness profiles associated with an application;

selecting, by the display controller and from the plurality of brightness profiles, the brightness profile associated with the current application; and causing, by the display controller, the brightness level of the display to decrease based on the brightness profile.

3. The method of claim 1, wherein determining the contrast level associated with the one or more images comprises;

identifying, by the GPU, a current application executing on the information handling system;

accessing, by the GPU, a look up table (LUT) storing a plurality of contrast profiles, each of the plurality of contrast profiles associated with an application;

selecting, by the GPU and from the plurality of contrast profiles, the contrast profile associated with the with the current application; and applying, by the GPU, the contrast profile to the one or more images.

4. The method of claim 1, wherein determining the gamma level associated with the one or more images comprises at least one of:

calculating, by the GPU, the gamma level based on a logarithmic function; and calculating, by the GPU, the gamma level based on an exponential function.

5. The method of claim 1, wherein processing the one or more images based on the contrast level and the gamma level comprises:

determining, by the GPU, an ambient lighting within an environment of the user;

modifying, by the GPU, the contrast level based on the ambient lighting to generate a modified contrast level;

modifying, by the GPU, the gamma level based on the ambient lighting to generate a modified gamma level; and applying, by the GPU, the modified contrast level and the modified gamma level to the one or more images.

6. The method of claim 5, wherein determining the ambient lighting within the environment of the user comprises:

receiving, by the GPU, ambient lighting data from a processor subsystem of the information handling system, the ambient lighting data captured by one or more sensors of the information handling system.

7. One or more computer-readable non-transitory storage media embodying software that is operable when executed to:

monitor, by a display controller of the information handling system, a usage period of the display, the usage period indicating a period of time in which the display is in an illuminated state;

determine, by the display controller, that the usage period is greater than a threshold usage period;

cause, by the display controller, a brightness level of the display to decrease;

cause, by the display controller and in response to the decrease in the brightness level of the display, a lifecycle of the display to increase;

send, by the display controller, a signal to a graphics processing unit (GPU) of the information handling system, the signal indicating that the usage period is greater than the threshold usage period;

receive, by the GPU, the signal indicating that the usage period is greater than the threshold usage period;

determine, by the GPU, a contrast level associated with one or more images presented to a user via the display;

determine, by the GPU, a gamma level associated with the one or more images; and process, by the GPU, the one or more images based on the contrast level and the gamma level.

8. The media of claim 7, wherein to cause the brightness level of the display to decrease, the software is further operable when executed to:

identify, by the display controller, a current application executing on the information handling system;

access, by the display controller, a look up table (LUT) storing a plurality of brightness profiles, each of the plurality of brightness profiles associated with an application;

select, by the display controller and from the plurality of brightness profiles, the brightness profile associated with the current application; and cause, by the display controller, the brightness level of the display to decrease based on the brightness profile.

9. The media of claim 7, wherein to determine the contrast level associated with the one or more images, the software is further operable when executed to:

identify, by the GPU, a current application executing on the information handling system;

access, by the GPU, a look up table (LUT) storing a plurality of contrast profiles, each of the plurality of contrast profiles associated with an application;

select, by the GPU and from the plurality of contrast profiles, the contrast profile associated with the with the current application; and apply, by the GPU, the contrast profile to the one or more images.

10. The media of claim 7, wherein to determine the gamma level associated with the one or more images, the software is further operable when executed to:

calculate, by the GPU, the gamma level based on a logarithmic function; and calculate, by the GPU, the gamma level based on an exponential function.

11. The media of claim 7, wherein to process the one or more images based on the contrast level and the gamma level, the software is further operable when executed to:

determine, by the GPU, an ambient lighting within an environment of the user;

modify, by the GPU, the contrast level based on the ambient lighting to generate a modified contrast level;

modify, by the GPU, the gamma level based on the ambient lighting to generate a modified gamma level; and apply, by the GPU, the modified contrast level and the modified gamma level to the one or more images.

12. The media of claim 11, wherein to determine the ambient lighting within the environment of the user, the software is further operable when executed to:

receive, by the GPU, ambient lighting data from a processor subsystem of the information handling system, the ambient lighting data captured by one or more sensors of the information handling system.

13. A computing environment, comprising:

an information handling system including one or more processors; and one or more computer-readable non-transitory storage media coupled to one or more of the processors and comprising instructions operable when executed by one or more of the processors to cause the system to:

monitor, by a display controller of the information handling system, a usage period of the display, the usage period indicating a period of time in which the display is in an illuminated state;

determine, by the display controller, that the usage period is greater than a threshold usage period;

cause, by the display controller, a brightness level of the display to decrease;

cause, by the display controller and in response to the decrease in the brightness level of the display, a lifecycle of the display to increase;

send, by the display controller, a signal to a graphics processing unit (GPU) of the information handling system, the signal indicating that the usage period is greater than the threshold usage period;

receive, by the GPU, the signal indicating that the usage period is greater than the threshold usage period;

determine, by the GPU, a contrast level associated with one or more images presented to a user via the display;

determine, by the GPU, a gamma level associated with the one or more images; and process, by the GPU, the one or more images based on the contrast level and the gamma level.

14. The computing environment of claim 13, wherein to cause the brightness level of the display to decrease, the processors are further operable when executed to:

identify, by the display controller, a current application executing on the information handling system;

access, by the display controller, a look up table (LUT) storing a plurality of brightness profiles, each of the plurality of brightness profiles associated with an application;

select, by the display controller and from the plurality of brightness profiles, the brightness profile associated with the current application; and cause, by the display controller, the brightness level of the display to decrease based on the brightness profile.

15. The computing environment of claim 13, wherein to determine the contrast level associated with the one or more images, the processors are further operable when executed to:

identify, by the GPU, a current application executing on the information handling system;

access, by the GPU, a look up table (LUT) storing a plurality of contrast profiles, each of the plurality of contrast profiles associated with an application;

select, by the GPU and from the plurality of contrast profiles, the contrast profile associated with the with the current application; and apply, by the GPU, the contrast profile to the one or more images.

16. The computing environment of claim 13, wherein to determine the gamma level associated with the one or more images, the processors are further operable when executed to:

calculate, by the GPU, the gamma level based on a logarithmic function; and calculate, by the GPU, the gamma level based on an exponential function.

17. The computing environment of claim 13, wherein to process the one or more images based on the contrast level and the gamma level, the processors are further operable when executed to:

determine, by the GPU, an ambient lighting within an environment of the user;

modify, by the GPU, the contrast level based on the ambient lighting to generate a modified contrast level;

modify, by the GPU, the gamma level based on the ambient lighting to generate a modified gamma level; and apply, by the GPU, the modified contrast level and the modified gamma level to the one or more images.

18. The computing environment of claim 17, wherein to determine the ambient lighting within the environment of the user, the processors are further operable when executed to:

receive, by the GPU, ambient lighting data from a processor subsystem of the information handling system, the ambient lighting data captured by one or more sensors of the information handling system.

* * * * *